United States Patent [19]

Budzich

[11] E Re. 29,538

[45] Reissued Feb. 14, 1978

[54] LOAD RESPONSIVE FLUID CONTROL VALVE

[76] Inventor: Tadeusz Budzich, 80 Murwood Drive, Moreland Hills, Ohio 44022

[21] Appl. No.: 576,107

[22] Filed: May 9, 1975

Related U.S. Patent Documents

Reissue of:

[64] Patent No.: 3,744,517
Issued: July 10, 1973
Appl. No.: 185,146
Filed: Sept. 30, 1971

[51] Int. Cl.[2] ..... F15B 13/02; F15B 13/08

[52] U.S. Cl. ..... 137/596.2; 91/446; 137/596.1

[58] Field of Search ..... 137/596, 596.2, 596.12, 137/596.13, 117, 501, 503, 596.1; 91/461, 468, 445, 446, 448, 421

[56] References Cited

U.S. PATENT DOCUMENTS

| | | | |
|---|---|---|---|
| 2,477,669 | 8/1949 | Stephens | 91/446 X |
| 3,398,650 | 8/1968 | Garnjost | 91/421 |
| 3,410,306 | 11/1968 | Malott | 137/596.2 |
| 3,455,210 | 7/1969 | Allen | 137/596.13 |
| 3,470,694 | 10/1969 | Budzich | 137/596 X |
| 3,523,742 | 8/1970 | Gold | 137/596.1 X |
| 3,524,386 | 8/1970 | Cudnohufsky | 137/501 X |
| 3,532,119 | 10/1970 | Lind | 137/596 |
| 3,534,774 | 10/1970 | Tennis | 137/596 |
| 3,602,243 | 8/1971 | Holt | 137/596.12 X |
| 3,628,567 | 12/1971 | Bender | 137/596.2 X |
| 3,693,506 | 9/1972 | McMillen et al. | 91/448 X |

*Primary Examiner*—Alan Cohan
*Assistant Examiner*—Gerald A. Michalsky
*Attorney, Agent, or Firm*—William N. Hogg

[57] ABSTRACT

A direction and flow control valve for use in a central fluid power load responsive system having plurality of loads. The valve maintains a selected constant flow level for control of both positive and negative loads, irrespective of the change in the load magnitude or change in the fluid pressure, supplied to the valve. System is powered by a single variable volume pump equipped with a load responsive control, which automatically maintains pump discharge pressure at a level higher than the pressure required by the system's largest load. Each direction and flow control valve is equipped with a differential pressure regulating control, which is responsive to the load pressure for controlling the negative loads and preferably a second differential pressure regulating control for controlling the positive loads.

8 Claims, 4 Drawing Figures

LOAD RESPONSIVE FLUID CONTROL VALVE

Matter enclosed in heavy brackets [ ] appears in the original patent but forms no part of this reissue specification; matter printed in italics indicates the additions made by reissue.

BACKGROUND OF THE INVENTION

This invention relates generally to load responsive fluid control valves and to fluid power systems incorporating such valves which systems are supplied by a single variable displacement pump, equipped with an automatic load responsive control, and in which either one or a plurality of loads is individually controlled under positive and negative load conditions by separate control valves.

In more particular aspects this invention relates to direction and flow control valves and load responsive fluid power systems incorporating such valves capable of controlling simultaneously a number of loads under both positive and negative conditions.

Closed center load responsive central hydraulic systems are very desirable for a number of reasons. They permit load control with minimum of power losses and therefore, at high system efficiency and when controlling one load at a time provide a feature of flow control, irrespective of the variation in the magnitude of the load. In such a system a load responsive variable displacement pump control automatically maintains pump discharge pressure at a level higher, by constant pressure differential, than the pressure required to sustain the load. A variable orifice, introduced between pump and load, varys the flow supplied to the load, each orifice area corresponding to a different flow level which is maintained constant irrespective of variation in the magnitude of the load. The application of such a system is, however, limited by two basic system disadvantages. The pump control can maintain a constant pressure differential and therefore constant flow characteristics when operating only one load at a time. With two or more loads, simultaneously controlled, only the highest of the loads will retain the flow control characteristics, the speed of actuation of the lower loads varying with the change in magnitude of the highest load. This drawback can be overcome in part by the provision of a proportional valve as disclosed in my U.S. Pat. No. 3,470,694, dated Oct. 7, 1969. However, while this valve is effective in controlling positive loads it does not retain flow control characteristics when controlling negative loads, which instead of taking, supply the energy to the fluid system, and hence the speed of actuation of such a load in a negative load system will vary with the magnitude of the negative load. Especially with so-called overcenter loads where a positive load may become a negative load, such a valve will lose its speed control characteristics in the negative mode.

*Negative load can be controlled by valve disclosed in U.S. Patent 3,534,774 issued to Tennis. However, this valve is capable of controlling negative loads in one direction only and therefore cannot be used with inertia type loads and loads driven by fluid motors which require bi-directional control capability. Further, the Tennis device does not isolate the load signal from the load controller.*

SUMMARY OF THE INVENTION

It is therefore a principal object of this invention to provide an improved valve for load responsive fluid power system, which will retain system flow control characteristics when controlling both positive and negative loads.

It is another object of this invention to provide improved valve for load responsive fluid power system, in which multiplicity of positive and negative loads can be controlled, while the system speed control characteristics are retained.

It is a further object of the invention to provide an improved valve for load responsive fluid power system, which converts the energy of negative load by throttling, automatically maintaining a constant pressure difference between the load pressure and the valve outlet pressure.

*It is a further object of this invention to provide an improved valve capable of proportional control of negative loads in both directions of motor operation.*

*It is a further object of this invention to provide a valve for control of negative loads which when in neutral position will isolate the valve controller from the negative load signal.*

Briefly the foregoing and other additional objects and advantages of this invention are accomplished by providing a novel flow control valve, constructed according to the present invention, for use in load responsive central hydraulic systems. A flow control valve is positioned between variable pump and each motor. Each valve has an automatic valve outlet throttling section; and, when a plurality of valves are used, each also has an automatic inlet throttling section. Since load responsive pump control can only maintain a flow proportionality of one valve and one load at a time and since it cannot control flow proportionality in control of negative load, these valve inlet and outlet automatic throttling controls provide a constant pressure differential across valve spool, permitting retention of flow control characteristics, with simultaneous control of all loads both positive and negative.

Additional objects of the invention will become apparent when referring to the preferred embodiment of the invention as shown in the accompanying drawings and described in the following detailed description.

DESCRIPTION OF THE PREFERRED EMBODIMENTS

Figures 1, 2:
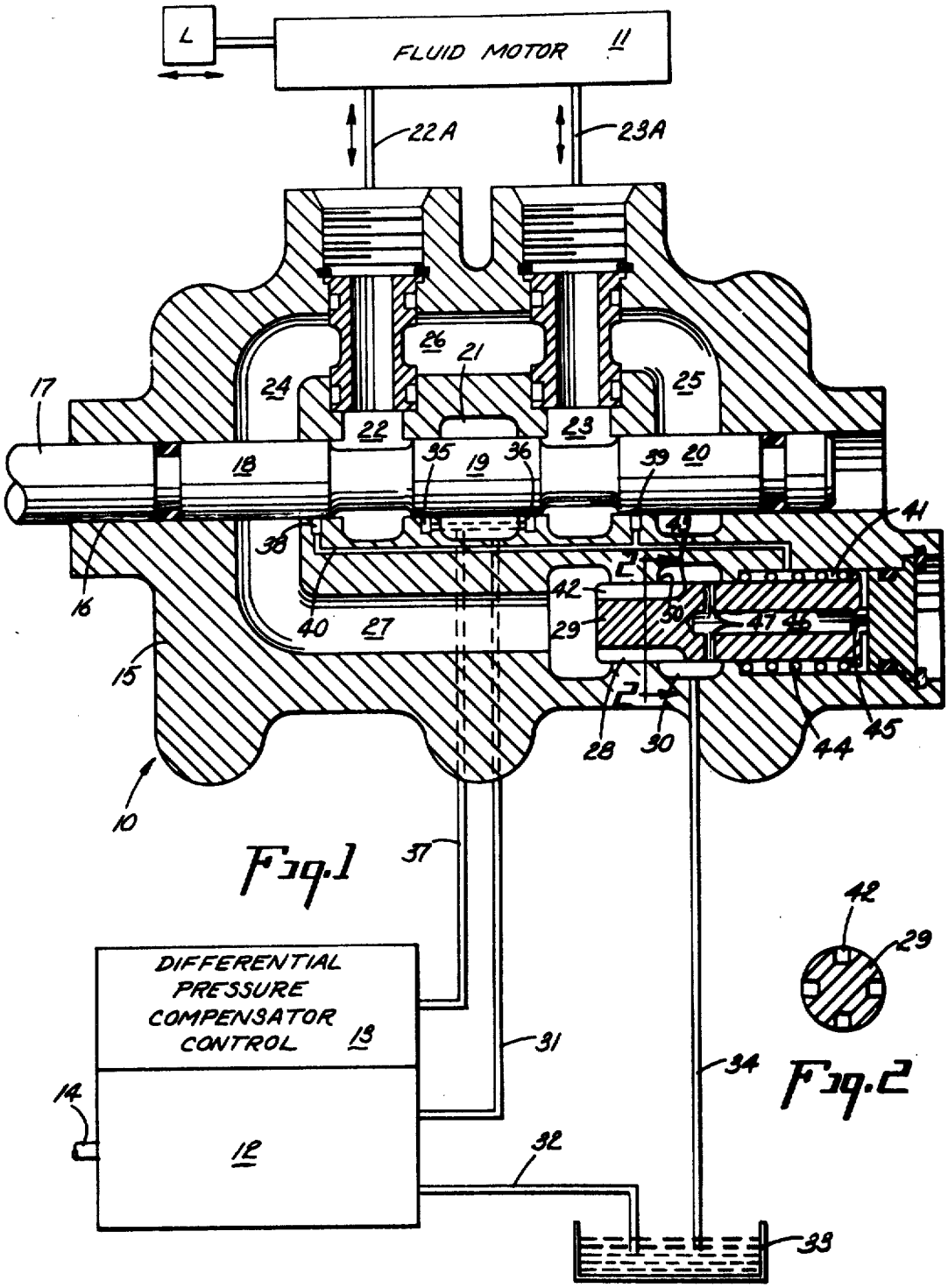
FIG. 1 is a longitudinal sectional view of one embodiment of a flow control valve including the control mechanism used in control of negative loads with system lines, pump and pump control shown diagramatically.
FIG. 2 is a sectional view taken substantially along the plane designated by the line 2—2 of FIG. 1.

Referring now to the drawings, and for the present to FIG. 1, embodiment of a flow control valve, generally designated as 10, is shown interposed between diagramatically shown fluid motor 11 driving a load L and a variable flow pump 12, equipped with a conventional displacement changing mechanism (not shown). The output of the pump is regulated by a differential pressure compensator control 13. This preferably is of the type shown in my U.S. Pat. No. 3,444,689. The variable flow pump 12 is driven through shaft 14 by a suitable prime mover, not shown.

The flow control valve 10 is a four-way type and has a housing 15 provided with a bore 16, axially guiding a valve spool 17. The valve spool 17 is equipped with lands 18, 19 and 20, which in the position shown will isolate fluid inlet chamber 21, load chambers 22 and 23 and outlet chambers 24 and 25 formed in the housing 15. The outlet chambers 24 and 25 are cross-connected through passage 26 and are connected through passage 27 and bore 28 and guiding control spool 29, to exhaust chamber 30.

The outlet of the pump 12 is connected through discharge line 31 to inlet chamber 21. The inlet of pump 12 is connected through line 32 to diagramatically shown reservoir 33. Reservoir 33 is also connected by line 34 to the exhaust chamber 30. Pressure sensing passages 35 and 36 communicate with the bore 16 between inlet chamber 21 and load chambers 22 and 23 respectively and are blocked by land 19 of the valve spool 17 in its neutral position, as shown in FIG. 1. The pressure sensing passages 35 and 36 are connected through line 37 to differential pressure compensator 13. Movement of the valve spool 17 to the right, from the position as shown, will connect first the pressure sensing passage 35 to the load chamber 22 and then connect the load chamber 22 with the inlet chamber 21. Movement of the control spool 17 to the left will first connect the pressure sensing passage 36 to the load chamber 23 and then connect the load chamber 23 with the inlet chamber 21.

As described in U.S. Pat. No. 3,444,689, the differential pressure compensator control adjusts pump flow to regulate the pump discharge pressure in response to the load pressure signal transmitted through line 37. In absence of any signal, corresponding to the blocked position of sensing passages 35 and 36 as shown in FIG. 1, the pump control automatically brings the variable pump into zero flow condition, at a minimum preselected pressure level, thus operating at minimum standby power loss. Movement of the land 19 of valve spool 17 to right will connect pressure sensing passage 35 to load chamber 22 and transmit the load pressure signal through line 37 to differential pressure compensator control 13. The differential pressure compensator control 13 will then automatically adjust the displacement of variable pump 12 to maintain its discharge pressure and therefore pressure in the inlet chamber 21 at a level higher, by a fixed pressure differential, than the load signal pressure in the load chamber 22.

Further movement of land 19 to the right will connect inlet chamber 21 to load chamber 22, resulting in a fluid flow from chamber 21 through line 22A to the fluid motor. Since the pressure in chamber 21 is maintained at a fixed pressure differential with respect to load chamber 22 by the variable pump control, the volume of flow per unit time will be proportional to the area of the orifice opened between chambers 21 and 22 and constant for each specific area, irrespective of the actual pressure level in the load chamber 22. Since the area of the orifice between chambers 21 and 22 is proportional to the travel of the valve spool 17, the fluid flow from inlet chamber 21 to load chamber 22 will also be proportional to the displacement of the valve spool 17, each specific position of the valve spool 17 corresponding to a specific constant fluid flow level, irrespective of the magnitude of the pressure level required to operate the load.

In a similar fashion, with movement of the valve spool 17 in opposite direction, the fluid from inlet chamber 21 to load chamber 23 is controlled and supplied to the opposite end of the fluid motor through line 23A. The foregoing regulation is in the positive load mode and does not per se constitute the present invention. The regulation in the negative load mode will now be described.

Additional pressure sensing passages 38 and 39 are provided in the bore 16 between the load chamber 22 and outlet chamber 24 and between load chamber 23 and outlet chamber 25 respectively. The pressure sensing passages 38 and 39 are connected by passage 40 with a fluid receiving space 41. Control spool 29, guided in bore 28, is equipped with longitudinally extending grooves 42 terminating in metering edge 43 providing communication between outlet chamber 25, passage 26, outlet chamber 24, passages 27, and exhaust chamber 30. (See also FIG. 2) Movement of control spool 29 from right to left will gradually reduce the effective area of the grooves 42, eventually metering edge 43 cutting off communication between passage 27 and exhaust chamber 30.

Movement of the control spool 29 from right to left is opposed by differential spring 44, normally biasing control spool 29 into the fully open position shown in FIG. 1. Space 41 is connected through resistance orifice 45, drillings 46 and 47 to exhaust chamber 30. Movement of the valve spool 17 from left to right will open at first pressure sensing passage 35 to load chamber 22 and pressure sensing passage 39 to load chamber 23. Pressure in load chamber 22, transmitted through pressure sensing passage 35 will activate, through line 37, the differential pressure compensator 13, in the manner as previously described. Simultaneously, pressure signal from load chamber 23 will be supplied through sensing passage 39 and will be transmitted to space 41 through passage 40.

Assume that the positive load generates a positive sustaining pressure in load chamber 22. Then the load chamber 23 will be at zero pressure and therefore zero pressure signal is transmitted through pressure sensing passage 39 to space 41. Further movement of valve spool 17 from left to right will connect load chamber 22 to inlet chamber 21 and load chamber 23 to outlet chamber 25. Since in the position as shown control spool 29 connects outlet chamber 25 with exhaust chamber 30, the fluid flows from inlet chamber 21 to load chamber 22 and through line 22A to fluid motor 11 and out of fluid motor 11 through line 23A to load chamber 23 and outlet chamber 25, which through passage 26, outlet chamber 24, passage 27, and control spool 29 is connected to exhaust chamber 30, which in turn through line 34 is connected to reservoir 33. For the positive load condition as just described the speed of the fluid motor is fully controlled by the area of the orifice between the inlet chamber 21 and load chamber 22 and the fixed pressure differential, maintained between these two chambers, by the differential pressure compensator control.

However, assume that during the above actuation of the fluid motor the load characteristics changed from positive to negative. With the valve spool 17 displaced to the right the pressure in the load chamber 22 would drop to zero. This pressure signal, transmitted through the pressure sensing passage 35, would bring the pump discharge pressure to the minimum standby level through the differential pressure compensated control, the pump automatically supplying required flow at this minimum pressure level. Due to the action of the negative load the pressure would be generated in load chamber 23 and this pressure signal transmitted through pressure signal passage 39 and passage 40 to space 41. Also, the pressure in the load chamber 23, reacting on the cross-section area of control spool 29, overcomes the preload force of differential spring 44, moving the control spool 29 from right to left. This movement will reduce the effective area of grooves 42 as the metering edge 43 approaches cut-off face 50. Resistance to flow through grooves 42 will raise the pressure in the passage 27 and outlet chamber 25 until a condition of force equilibrium is achieved. Under this condition of equilibrium, force generated due to pressure in load chamber 23 transmitted to space 41 through passage 40, reacting on the cross-section area of valve spool 29, is balanced by the force generated due to the pressure in passage 27, acting on the cross-section area of control spool 29 plus the biasing force of differential spring 44. Therefore under these conditions, control spool 29 will automatically assume a throttling position, maintaining a constant pressure differential between load chamber 23 and outlet chamber 25. This constant pressure differential is equal to preload of differential spring 44 divided by cross-section area of the control spool 29.

Since modulating control spool 29 maintains by throttling action a constant pressure differential between load chamber 23 and outlet chamber 25, flow between these two chambers will be directly proportional to the area of orifice created by valve spool 17 between these chambers and constant for each particular value of this area irrespective of the pressure level in load chamber 23 sustaining the negative load. Preload in the differential spring 44 can be so selected that the equivalent constant pressure differential is the same as the constant pressure differential, regulated by the pump control. In this way the flow control characteristics of the valve can be maintained in both directions of fluid motor operation irrespective of the magnitude of the positive or negative load.

When starting with a negative load, displacement of the valve spool 17 in appropriate direction will transmit first a zero pressure signal to the pump control and a load sustaining pressure signal to the control spool 29. Since at that time the load chamber sustaining the negative load pressure is still isolated from the outlet chamber, the control spool 29 will move all the way from right to left under the generated load pressure, isolating passage 27 from the exhaust chamber 30. Further movement of valve spool 17 will connect the pressurized load chamber with the outlet chamber, gradually increasing the pressure in passage 27, until control spool 29 moves to its modulating position maintaining a constant pressure differential in a manner as already described. In this way flow control feature will be retained during operation of negative load.

Movement of the valve spool 17 from right to left from the position shown will actuate the fluid motor 11 in the opposite direction, with the chamber 23 becoming the inlet chamber and chamber 24 becoming the outlet chamber. Thus the valve is double acting in that it controls negative loads in either direction of movement.

To allow for leakage and increase stability of the control a resistance orifice 45 is provided which connects space 41 through passages 46 and 47 with exhaust chamber 30. The area of resistance orifice 45 is very much smaller than the area of pressure signal passages 38 and 39.

Figure 3:
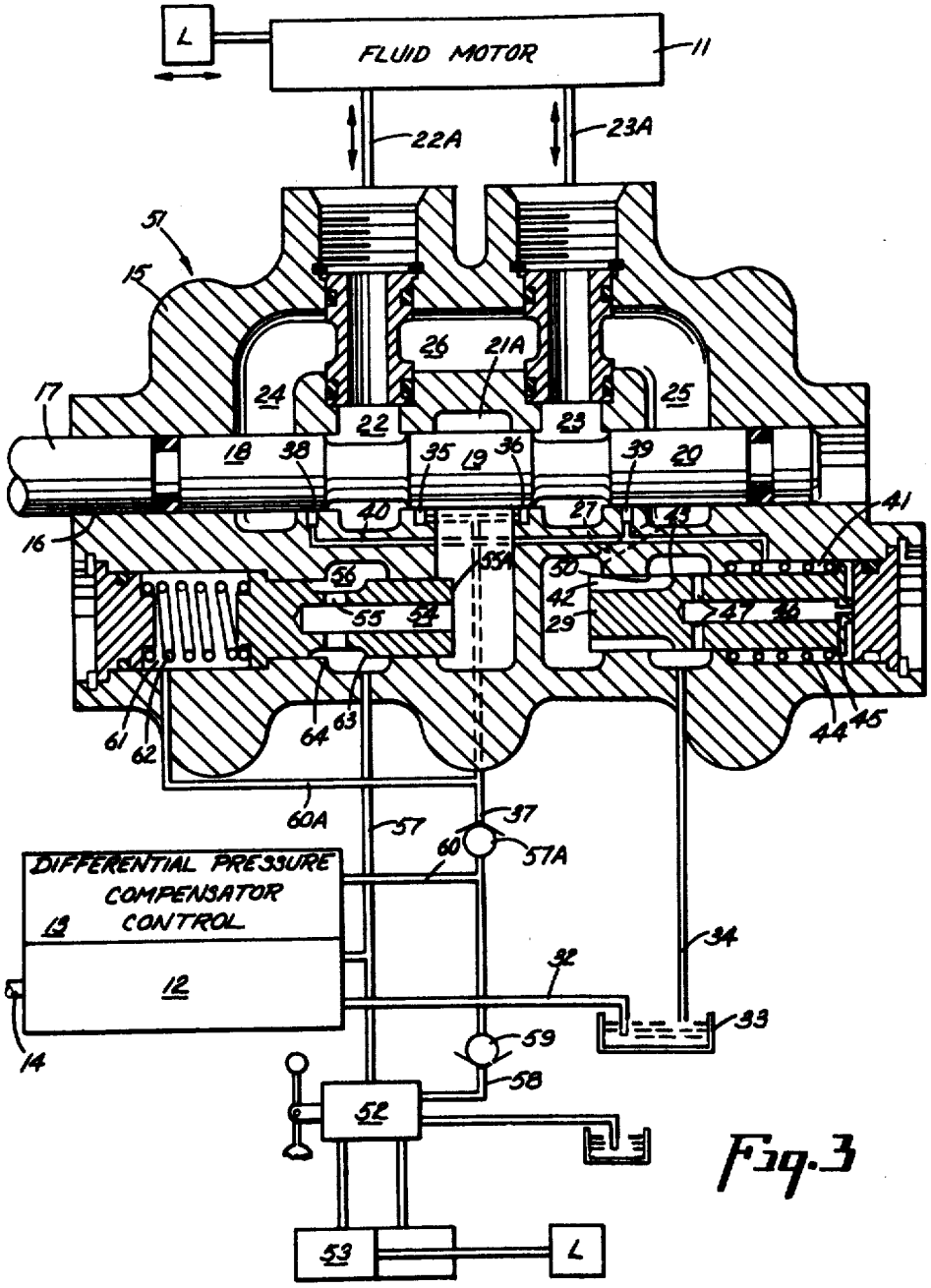
FIG. 3 is a longitudinal sectional view of another embodiment of a flow control valve including two control mechanisms used in control of multiple positive and negative loads with additional valve, pump, and power lines shown diagramatically.

Referring now to FIG. 3, another embodiment of a flow control valve, generally designated as 51, is shown interposed between fluid motor 11 and variable displacement pump 12. A second similar schematically shown flow control valve 52 is interposed between a second fluid motor 53 and the variable displacement pump 12. The general configuration of the flow control valve 51, including the valve spool 17, control spool 29, position of the outlet and load chambers and location of the pressure sensing passages are identical to FIG. 1 and the valve operates in an identical manner to control negative loads. However this valve will also control positive loads. The mechanism for this function is as follows.

Supply chamber 21A is connected through passages 54 and 55, of inlet control valve 55A, to inlet chamber 56, through which line 57 is connected to the outlet port of the pump. Load sensing line 37, in communication with load sensing passages 35 and 36, is connected through check valve 57A and line 60 to differential pressure compensator 13. Similarly, control valve 52 is connected through load sensing line 58 and check valve 59 and line 60 to the differential pressure compensator control. Load sensing line 37 is connected through line 60A to space 61. The control valve 55A which extends into space 61 is biased towards position as shown by differential spring 62. (As noted above, the operation of control valve 29 of FIG. 3 is identical to operation of control valve 29 of FIG. 1, the control valve maintaining a constant pressure differential between appropriate load chamber and outlet chambers 24 and 25 and passage 27.)

Assume the flow control valve 51 is actuated, the flow control valve 52 remaining in its neutral position. Assume that when actuating the flow control valve 51 the spool valve 17 was moved from left to right, connecting load sensing passage 35 to load chamber 22. Assume that load chamber 22 is subjected to pressure sustaining positive load. Pressure signal from load sensing passage 35 will be transmitted through lines 37 and through check valve 57A and line 60 to differential pressure compensator control 13, which in a manner as previously described, will adjust the displacement control of variable volume pump 12 to maintain inlet chamber 56 at a pressure higher by a fixed pressure differential than the pressure in load chamber 22.

The pressure signal from line 37 will also be transmitted through line 60A to space 61. Control valve 55A is then subjected to pump discharge pressure, transmitted through passages 55 and 54 to supply chamber 21A, acting on the cross-sectional area of the control valve 55A in one direction and the pressure existing in load chamber 22, connected to space 61, acting on the cross-section of control valve 55A, plus the preload of the differential spring 62 in the opposite direction. As already mentioned the pressure in space 61 is always smaller by a constant pressure differential than the discharge pressure of the pump and therefore pressure in inlet chamber 56 and supply chamber 21A. The preload in the differential spring 62 is so selected that it equals this constant pressure differential, multiplied by the cross-section area of control valve 55A so the control valve 55A, subjected to these forces, will remain in position as shown in FIG. 3. Therefore as long as differential pressure compensated control 13 controls the variable flow pump 12 to maintain a constant pressure differential between pump discharge pressure and the appropriate load chamber pressure, the control valve 55A will remain inactive. Under these conditions flow control valve 51 will perform in an identical way as control valve 10 of FIG. 1, when controlling both positive and negative loads.

However, assume that the flow control valves 51 and 52 are actuated simultaneously. In this case the flow control valve, having the highest load controls the output pressure from the pump due to well known action of check valves 57A and 59 whereby the higher load pressure signal will be transmitted from control valve 52 to differential pressure compensator control 13.

Assuming that the load from motor 53 is higher the check valve 59 passes the signal but check valve 57A isolates the higher pressure signal from lines 37 and 60A. In a manner as previously described, the differential pressure compensator control 13 will respond to the load control signal from flow control valve 52, the flow control valve 52 fully retaining flow control features in control of the higher load. However in the case of valve 51 the pump discharge pressure in line 57 will exceed the control fixed pressure differential, disturbing the equilibrium of the control valve 55A. Under the action of unbalanced forces, control valve 55A will move from right to left, gradually moving metering edge 63 of control valve 55A toward face 64, thus reducing the effective area between inlet chamber 56 and supply chamber 21A. The movement will continue which will reduce the pressure in chamber 21A until equilibrium is restored. Since, as previously described, the preload in the differential spring 62 is equal to the product of the constant differential pressure of the pump control and cross-section area of the control valve 55A, the control valve 55A will modulate, throttling the excess pressure in the inlet chamber 56 and maintain the supply chamber 21A at a fixed pressure differential above the load signal from the appropriate load chamber. If the load should become negative, the pressure in the load chamber 22 would drop to or near zero. This would cause the valve 55A to move further from right to left, throttling most of the pressure of chamber 56 to maintain constant pressure differential between supply chamber 21A and load chamber 22. Simultaneously the pressure in the load chamber 23 would increase actuating the valve 29 as previously described to control the negative load.

In this way both valves 52 and 51 when operated simultaneously will fully retain the flow control characteristics in control of both positive and negative loads. Valve 51 also is double acting and will control both positive and negative loads in either direction depending upon the direction of movement of valve spool 17.

Figure 4:
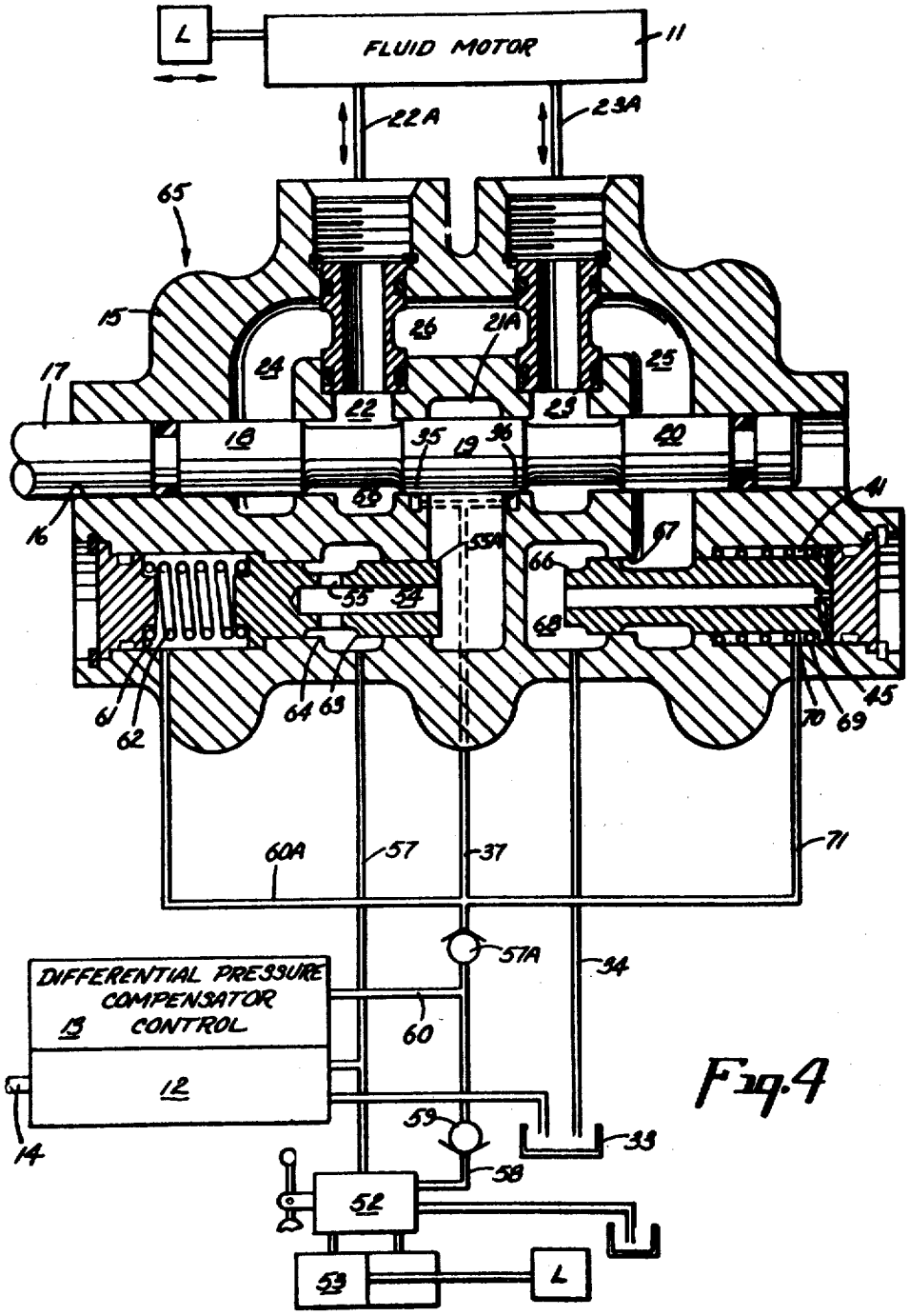
FIG. 4 is a longitudinal sectional view of still another embodiment of flow control valve.

Referring now to FIG. 4, yet another flow control valve generally designated as 65 is shown. This valve is similar to that of FIG. 3 with respect to control of positive loads but has a modified negative load control section. A negative control spool 66 is located in a bore 67 connecting outlet chambers 25 and 24 and an exhaust chamber 68. In its normal position control valve 66, under action of differential spring 69, maintains the passage between outlet chambers and exhaust chamber 68 closed. Space 70 is connected with pressure sensing passages 35 and 36 through lines 37 and 71.

Assume that valve spool 17 was moved from left to right connecting first pressure sensing passage 35 to pump differential pressure compensator control and then connecting load chamber 22 with supply chamber 21A and load chamber 23 with outlet chamber 25. Assume also that chamber 22 is subjected to pressure of a positive load. In a manner as previously described, a pressure signal from the compensator control will be supplied through pressure sensing passage 35 to the pump control, adjusting it accordingly. A pressure signal will also be supplied from the compensator control to space 70. Pressure in space 70 acting on cross-sectional area of control valve 66 will move it from right to left against preload of differential spring 69, opening the passage between exhaust chamber 68 and outlet chambers 25 and 24 and will maintain it open as long as a positive load is operated from load chamber 22.

Assume that midway through the actuation the positive load would become a negative load and the pressure in the load chamber 22 would start dropping to zero level. The differential pressure compensator control will still maintain a constant pressure differential between supply chamber 21A and load chamber 22. However, since load chamber 23 is connected to outlet chamber 25 and since load chamber 23 is now pressurized, due to the action of negative load, the speed of actuation of the negative load will tend to increase, further reducing pressure in the load chamber 22. Since load chamber 22 is connected with space 70 through pressure sensing passage 35 and lines 37 and 71, the differential spring 69 will move the control valve 66 from left to right. This will restrict the passage opening around bore 67 thus increasing the pressure in the outlet chamber 25. This increase in pressure in outlet chamber 25 will reduce the pressure differential between load chamber 23 and outlet chamber 25, proportionally reducing the flow between these two chambers. This in turn will tend to increase the pressure in the load chamber 22 and therefore pressure in space 70, modulating the throttling action of the control valve 66, to maintain flow control during operation of negative load. In this way control valve 65 of FIG. 4 is capable of controlling in a multiple load system both positive and negative loads. This valve also is double acting in that it can control in either direction of movement of the motor.

Although preferred embodiments of this invention have been shown and described in detail it is recognized that the invention is not limited to the precise forms and structure shown and various modifications and rearrangements as will readily occur to those skilled in the art upon full comprehension of this invention may be resorted to without departing from the scope of the invention as defined in the claims.

What is claimed is:

1. A valve assembly comprising a housing having a fluid inlet chamber, [a] *at least one* fluid load chamber, a fluid outlet chamber, and a fluid exhaust means, *signal passage means between said load chamber and said outlet chamber,* first valve means for selectively interconnecting said load chamber with said inlet chamber, *said load chamber with said signal passage means, and said load chamber with said signal passage means* and said outlet chamber to meter fluid flow to and from said load chamber, and second valve means interconnecting said outlet chamber and said exhaust means, *said second valve means having means responsive to pressure in said signal*

*passage means and pressure in said outlet chamber and* operable to maintain a constant pressure difference between said load chamber and said outlet chamber when said load *chamber, said signal passage means* and *said* outlet chamber[s] are interconnected and said load chamber is pressurized.

[2. A valve assembly as set forth in claim 1 wherein said second valve means is operable directly responsive to fluid pressure in said load chamber.]

3. [Valve] *A valve* assembly as set forth in claim 1 wherein said first valve means includes a valve spool axially guided in a spool bore and movable from a neutral position to at least one actuated position, said valve spool isolating said load chamber [from], said fluid inlet chamber and said fluid outlet chamber [and] *from each other and blocking said signal passage means from* said second valve means when in [the] neutral position.

4. A valve assembly as set forth in claim 3 wherein said housing includes a pressure signal passage interconnecting said spool bore and said second valve means, said valve spool when displaced from its neutral position toward an actuated position first interconnecting said load chamber with said second valve means through said pressure signal passage and then interconnecting said load chamber with said outlet chamber.

[5. A valve assembly as set forth in claim 1 wherein said second valve means includes a control spool guided in a bore interconnecting said outlet chamber and said exhaust means.]

[6. A valve assembly as set forth in claim 5 wherein said control spool is biased in one direction both by pressure in said outlet chamber and by spring means and in the other direction by pressure in said load chamber.]

[7. A valve assembly comprising a housing having a fluid inlet chamber, a fluid supply chamber, a fluid load chamber, a fluid outlet chamber and fluid exhaust means, first valve means for selectively interconnecting said fluid load chamber with said fluid supply chamber and said fluid outlet chamber to meter fluid flow to and from said load chamber, second valve means interconnecting said outlet chamber and said exhaust means operable to maintain a constant pressure difference between said fluid outlet chamber and said fluid load chambe when said load chamber is pressurized and connected to said outlet chamber, and third valve means interconnecting said fluid inlet chamber and said supply chamber and operable to maintain a constant pressure difference between said fluid load chamber and said fluid supply chamber when said chambers are interconnected by said first valve means and said supply chamber is pressurized.]

[8. Valve assembly as set forth in claim 7 wherein said second valve means is operable responsive to fluid pressure in said load chamber when said load chamber is connected to said outlet chamber by said first valve means, and said third valve means is operable responsive to fluid pressure in said load chamber when said load chamber is connected to said supply chamber by said first valve means.]

[9. A valve assembly as set forth in claim 7 wherein said first valve means includes a valve spool axially guided in a spool bore and movable from a neutral position to at least one actuated position, said valve spool isolating said load chamber from said fluid supply chamber and said fluid outlet chamber and said second valve means and said third valve means when in the neutral position.]

[10. A valve assembly as set forth in claim 9 wherein said housing includes a first signal passage interconnecting said spool bore and said second valve means and a second signal passage interconnecting said spool bore and said third valve means, said first and second signal passages being positioned such that when said valve spool is displaced from the neutral position in one direction it first interconnects said load chamber with said second valve means through said first signal passage and then interconnects said load chamber with said outlet chamber and when said valve spool is displaced in other direction it first interconnects said load chamber with said third valve means through said second signal passage and then interconnects said load chamber with said supply chamber.]

11. A valve assembly comprising a housing having a fluid inlet chamber, a fluid supply chamber, first and second fluid load chambers, a fluid outlet chamber and fluid exhaust means, first valve means for selectively interconnecting said fluid load chambers with said fluid supply chamber and said fluid outlet chamber to meter fluid flow to and from said load chambers, second valve means interconnecting said outlet chamber and said exhaust means and operable to provide a passage between said outlet chamber and said exhaust means open above a preselected pressure level in the load chamber connected by said first valve means to said supply chamber and progressively reduce said passage opening upon pressure in said load chamber connected by said first valve means to said supply chamber dropping below said preselected pressure level, and third valve means interconnecting said fluid inlet chamber and said supply chamber operable to maintain a constant pressure difference between said fluid supply chamber and said fluid load chamber connected thereto.

12. A fourway fluid control valve assembly comprising a housing having an outlet chamber, first and second load chambers, an inlet chamber, a valve bore in direct communication with said aforementioned chambers, said valve bore axially guiding a valve spool having lands, said valve spool having a neutral position in which said lands isolate said chambers, an exhaust chamber in said housing, valve means interconnecting said outlet chamber and said exhaust chamber and operable to maintain a constant pressure differential between either one of said load chambers which is pressurized and said outlet chamber when connected thereto, said valve means including a control spool guided in a control bore, fluid throttling means on said control spool to control fluid flow between said outlet chamber and said exhaust chamber, said control spool being biased in a direction to increase fluid flow by pressure in said outlet chamber when said control bore is connected thereto and by spring means and in the other direction by pressure in one of said load chambers when the control bore is connected thereto and said load chamber is pressurized, first pressure signal passage interconnecting one region of said valve bore between said outlet chamber and said first load chamber and said control bore, second pressure signal passage interconnecting another region of valve bore between said outlet chamber and said second load chamber and said control bore, said first and second pressure signal passages being blocked by said valve spool in its neutral position, said valve spool when displaced from its neutral position in one direction first interconnecting said first load chamber through said first pressure signal passage to said control bore and then connecting said first load chamber to said outlet chamber and said second load chamber to said inlet chamber, said valve spool when displaced from its neutral position in the opposite direction first interconnecting said second load chamber through said second pressure signal passage to said control bore and then connecting said second load chamber to said outlet chamber and said first load chamber to said inlet chamber, whereby the valve will control a load under negative load conditions.

13. A fourway fluid control valve assembly comprising a housing having an outlet chamber, first and second load chambers, a supply chamber, a valve bore in direct communication with said aforementioned chambers, said valve bore axially guiding a valve spool having lands, said valve spool having a neutral position in which said lands isolate said chambers, an exhaust chamber in said housing, first valve means interconnecting said outlet chamber and said exhaust chamber and operable to maintain a constant pressure differential between either one of said load chambers which is pressurized and said outlet chamber when connected thereto, said first valve means including a first control spool guided in a first control bore, first fluid throttling means on said first control spool, said first control spool being biased in one direction by pressure in said outlet chamber when connected to said first control bore and by spring means and in the other direction by pressure in one of said load chambers when connected thereto, an inlet chamber in said housing, second valve means interconnecting said supply chamber and said inlet chamber operable to maintain a constant pressure differential between either of said load chambers when pressurized and said supply chamber when connected thereto, said second valve means including second control spool guided in a second control bore, second throttling means on said second control spool to throttle fluid flow between said inlet chamber and said supply chamber, said second control spool being biased in a direction to lessen fluid flow by pressure in said supply chamber when connected thereto and in a direction to increase fluid flow by pressure in one of said load chambers when connected thereto and spring means, first pressure signal passage interconnecting one region of the valve spool bore between said outlet chamber and said first load chamber and said first control bore, second pressure signal passage interconnecting another region of the valve spool bore between said outlet chamber and said second load chamber and said first control bore, a third pressure signal passage interconnecting another region of valve spool bore between said first [second] load chamber and said supply chamber and said second control spool, *a fourth pressure signal passage interconnecting another region of the valve spool bore between said second load chamber and said supply chamber and said second control spool,* said first, second, third and fourth pressure signal passages being blocked by said valve spool in its neutral position, said valve spool when displaced from its neutral position in one direction first interconnecting said first load chamber through said first pressure signal passage to said first valve means and said second load chamber through said fourth pressure signal passage to said second valve means and then interconnecting said first load chamber with said outlet chamber and said second load chamber with said supply chamber, said valve spool when displaced from its neutral position in opposite direction first interconnecting said second load chamber through said second pressure signal passage to said first valve means and said first load chamber through said third pressure signal passage to said second valve means and then interconnecting said second load chamber with said outlet chamber and said first load chamber with said supply chamber, whereby the valve will control a load under both positive and negative load conditions.

14. A fourway fluid control valve assembly comprising a housing having an outlet chamber, first and second load chambers, a supply chamber, a valve bore in direct communication with said aforementioned chambers, said valve bore axially guiding a valve spool having lands, said valve spool having a position in which said lands isolate said chambers, an exhaust chamber in said housing, first valve means interconnecting said outlet chamber and said exhaust chamber and operable to maintain passage between said chambers open above preselected pressure level in said load chamber connected to said supply chamber and progressively reduce said passage upon pressure in said load chamber connected to said supply chamber dropping below said preselected pressure level, said first valve means including first control spool guided in a control bore, first fluid throttling means on said first control spool, said first control spool being biased in a direction to increase the fluid passage by pressure in said load chamber connected to said supply chamber and a direction to reduce fluid passage by spring means, an inlet chamber in said housing, second valve means interconnecting said supply chamber and said inlet chamber operable to maintain a constant pressure differential between said load chamber that is connected to the supply chamber and the supply chamber, said second valve means including a second control spool guided in a second control bore, second throttling means on said second control spool, said second control spool being biased in a direction to decrease fluid flow by pressure in said supply chamber and in a direction to increase flow by pressure in the load chamber and a spring means, first pressure signal passage interconnecting an area of valve spool bore between said first load chamber and said supply chamber and said second control spool, second pressure signal passage interconnecting an area of valve spool bore between said second load chamber and said supply chamber and said second control spool, said first and second pressure signal passages being blocked by said valve spool in its neutral position, said valve spool when displaced from its neutral position in one direction first interconnecting said first load chamber through said first pressure signal passage to said second control spool and then interconnecting said first load chamber to said supply chamber and said second load chamber to said [second] outlet chamber, said valve spool when displaced in opposite direction first interconnecting said second load chamber with said supply chamber and said first load chamber to said [first] outlet chamber, whereby the valve assembly controls a load under both positive and negative load conditions.

*15. A fluid control valve assembly comprising a housing having an outlet chamber, a load chamber, an inlet chamber, a valve bore in direct communication with said aforementioned chambers, said valve bore axially guiding a valve spool having lands, said valve spool having a neutral position in which said lands isolate said chambers, an exhaust chamber in said housing, a valve means interconnecting said outlet chamber and said exhaust chamber and operable to maintain a constant pressure differential be-*

*tween said load chamber and said outlet chamber when said load chamber is pressurized and connected thereto, said valve means including a control spool guided in a control bore, fluid throttling means on said control spool to control fluid flow between said outlet chamber and said exhaust chamber, said control spool being biased in a direction to increase fluid flow by pressure in said outlet chamber and by spring means and in the other direction by pressure in said load chamber when the control bore is connected thereto and said load chamber is pressurized, pressure signal passage interconnecting region of said valve bore between said outlet chamber and said load chamber and said control bore, said pressure signal passage being blocked by said valve spool in its neutral position, said valve spool when displaced from its neutral position in one direction first interconnecting said load chamber through said pressure signal passage to said control bore connecting said load chamber to said outlet chamber, said valve spool when displaced from its neutral position in the opposite direction interconnecting said load chamber to said inlet chamber, whereby the valve will control a load under negative load conditions.*

* * * * *